March 7, 1944.  F. MARTINDELL  2,343,686
ELECTRIC WELDING MACHINE
Filed Sept. 4, 1942    4 Sheets-Sheet 1
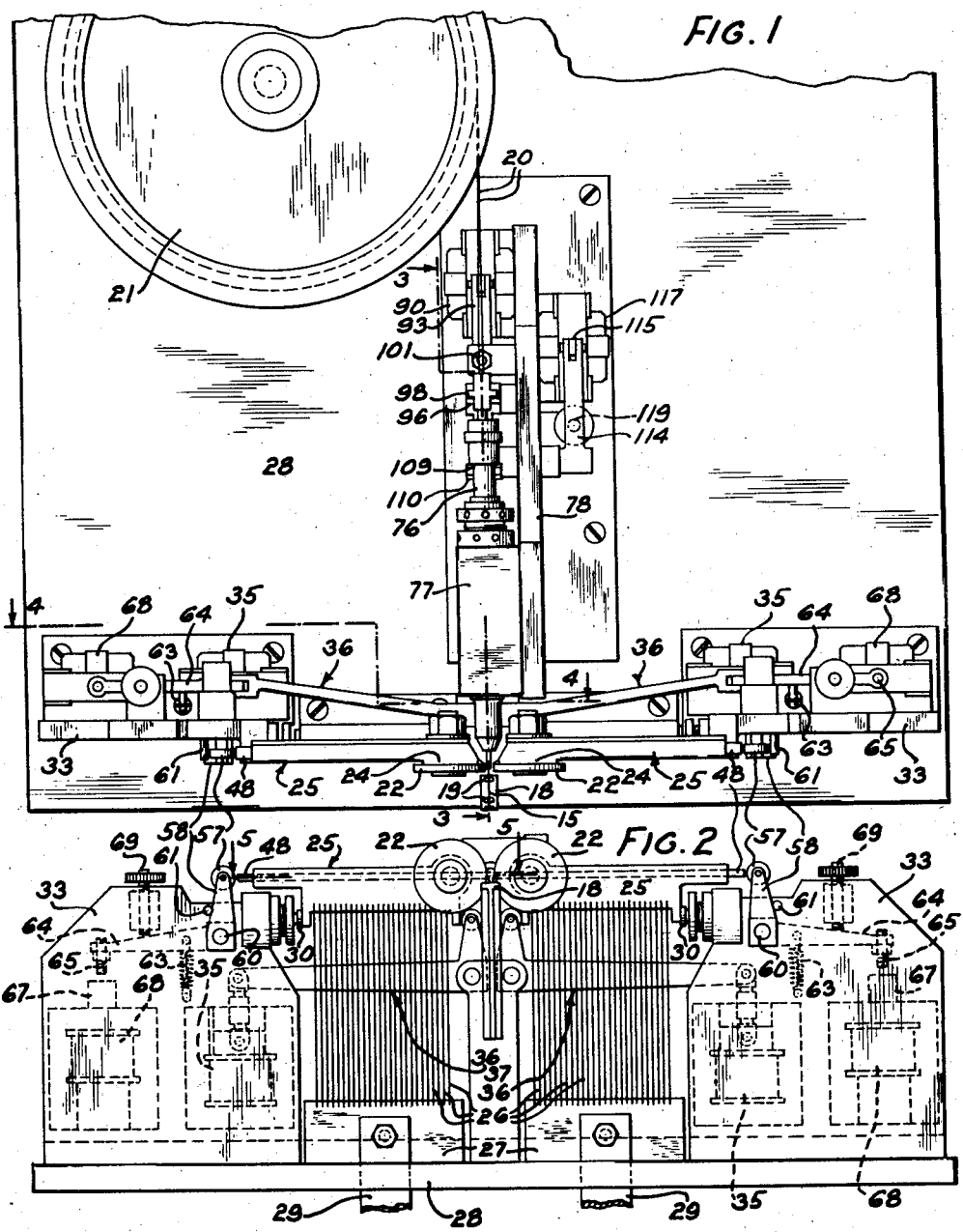
INVENTOR
F. MARTINDELL
BY Harry L. Duft
ATTORNEY

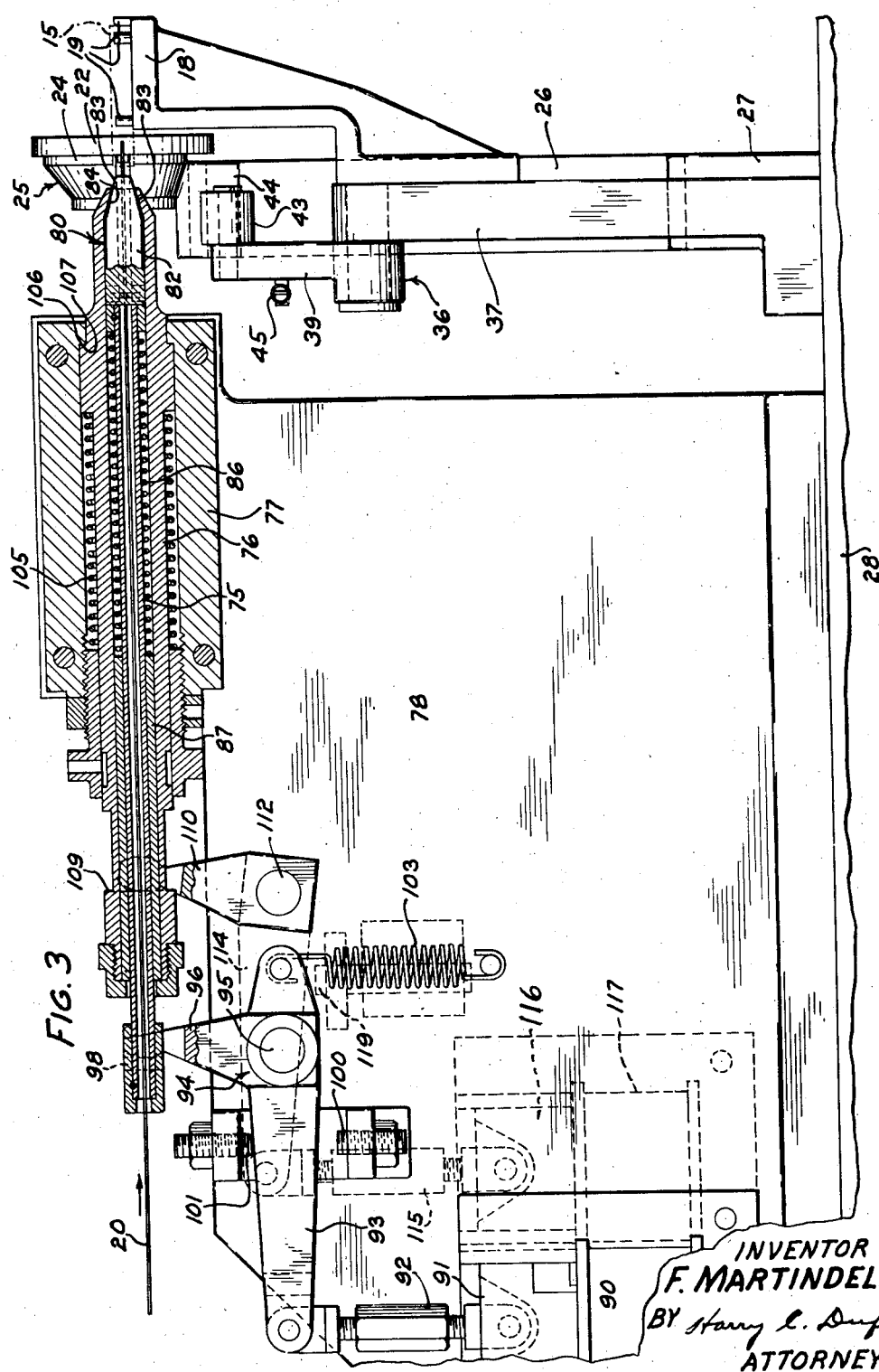

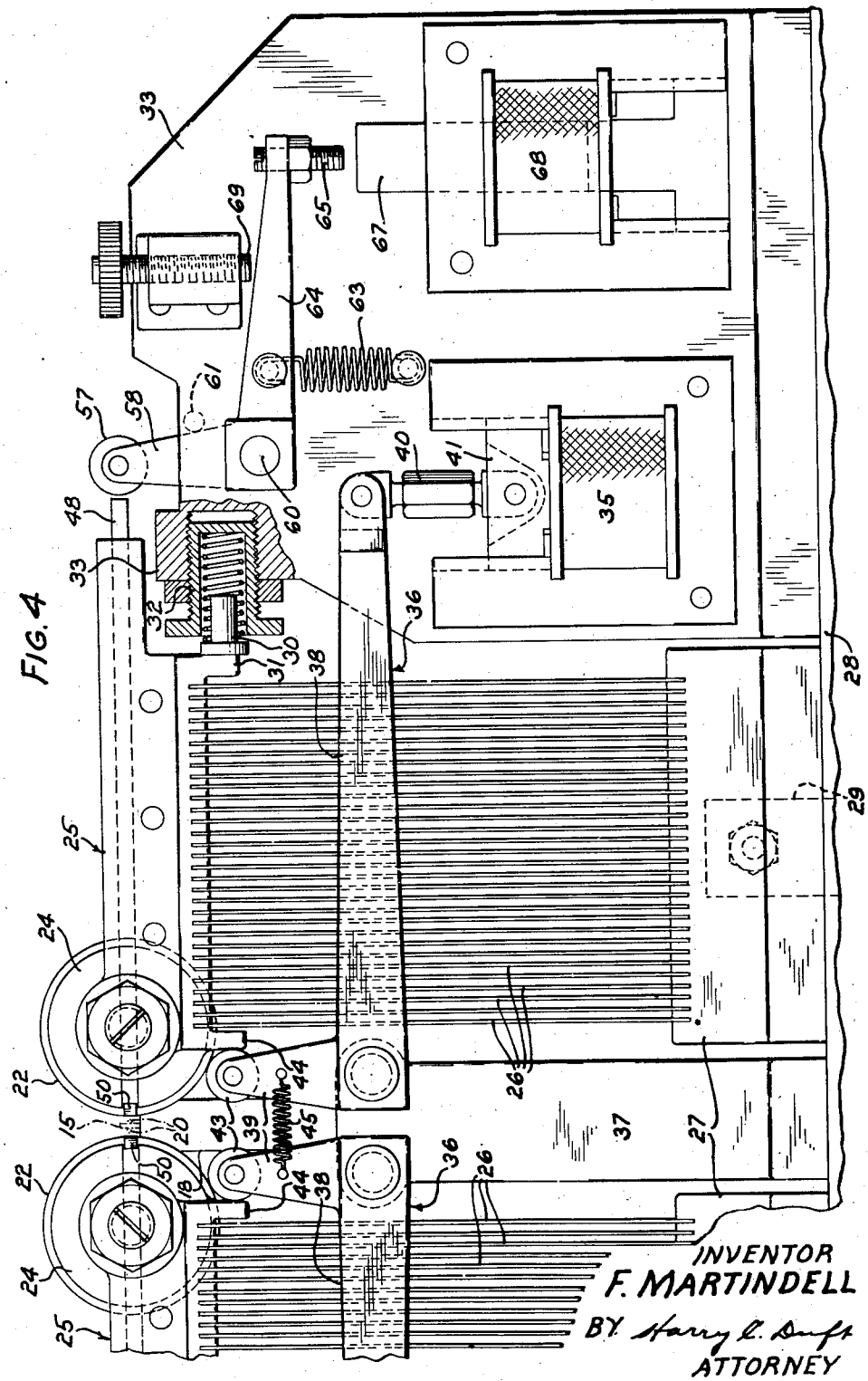

March 7, 1944.  F. MARTINDELL  2,343,686
ELECTRIC WELDING MACHINE
Filed Sept. 4, 1942  4 Sheets-Sheet 4
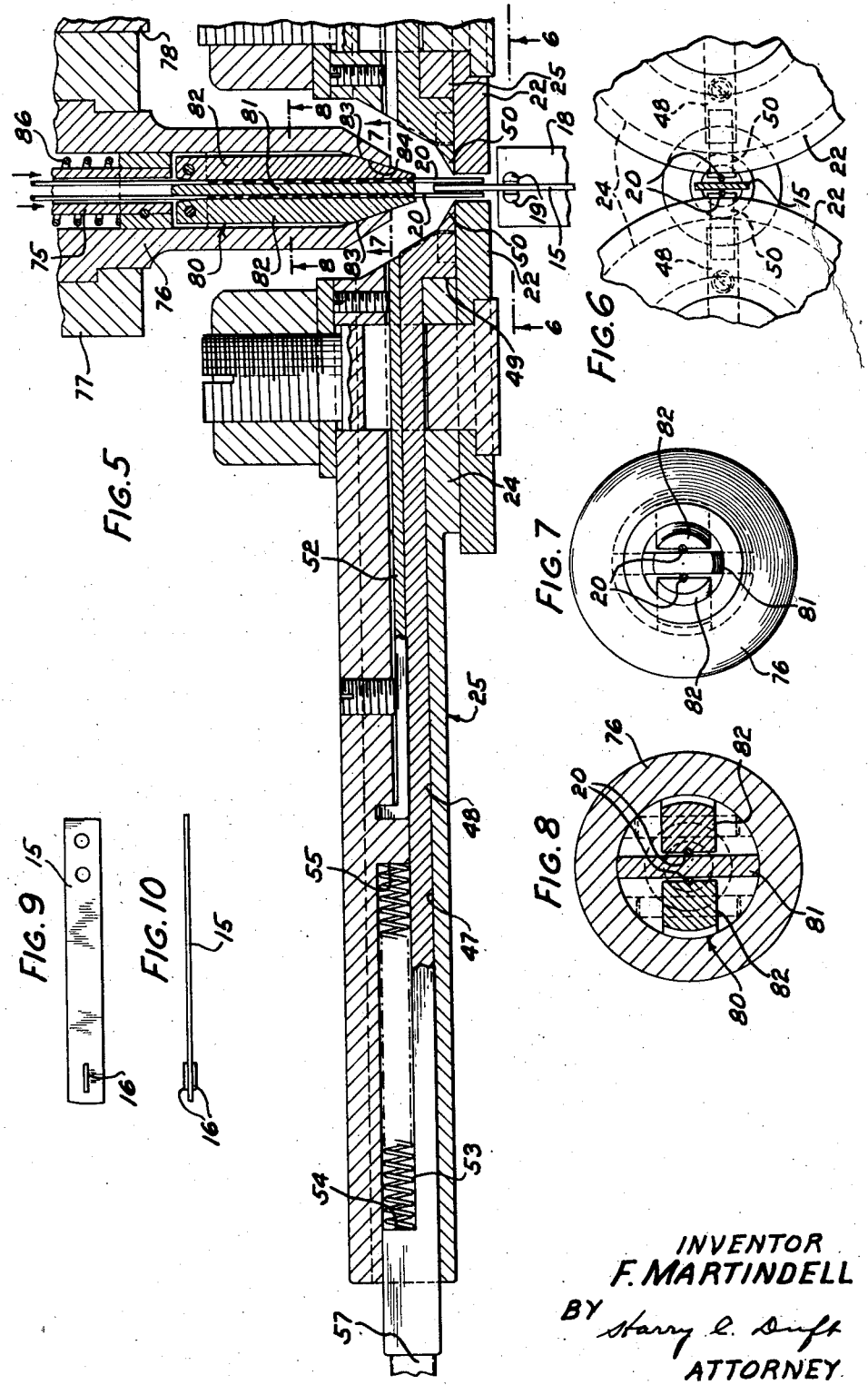
INVENTOR
F. MARTINDELL
BY *Harry E. Duft*
ATTORNEY Patented Mar. 7, 1944

2,343,686

UNITED STATES PATENT OFFICE 2,343,686

ELECTRIC WELDING MACHINE

Frank Martindell, Western Springs, Ill., assignor to Western Electric Company, Incorporated, New York, N. Y., a corporation of New York Application September 4, 1942, Serial No. 457,243

9 Claims. (Cl. 219—4)

This invention relates to electric welding machines, and more particularly to machines for welding contacts to switch springs or other elements of electrical apparatus.

Objects of the invention are to provide an improved and highly efficient electric welding machine of the type referred to.

In accordance with one embodiment of the invention, an electric contact welding machine is provided which comprises a pair of opposed welding electrodes mounted for oscillatory movement toward and away from each other by being supported on the free ends of a series of metal reeds or flat springs which also serve to conduct the welding current to the welding electrodes. The machine further comprises means for intermittently advancing two strips of contact metal to insert the end portions thereof between the two electrodes, means for locating and supporting a switch spring or the like between the end portions of the contact metal strips, means for moving the two electrodes toward each other to clamp the end portions of the contact metal strips to opposite sides of the switch spring, and means for severing the clamped end portions from the continuous strips prior to the welding operation.

Other features and advantages of the invention will be apparent from the following detailed description when read in conjunction with the accompanying drawings, in which Fig. 1 is a plan view of a contact welding machine embodying the features of the invention;

Fig. 2 is a front elevational view thereof;

Fig. 3 is an enlarged fragmentary vertical sectional view taken on line 3—3 of Fig. 1;

Fig. 4 is an enlarged fragmentary vertical sectional view taken on line 4—4 of Fig. 1;

Fig. 5 is an enlarged fragmentary horizontal sectional view taken on line 5—5 of Fig. 2;

Figs. 6, 7 and 8 are enlarged detail sectional views taken on lines 6—6, 7—7, and 8—8, respectively, of Fig. 5; and Figs. 9 and 10 are plan and elevation views, respectively, of a switch spring having contacts welded to opposite sides thereof by means of the welding machine of Figs. 1 to 8, inclusive.

The machine illustrated in the drawings is capable of welding simultaneously to opposite sides of a switch spring 15 (Figs. 9 and 10), two bar type contacts 16, 16 previously severed by the machine from two continuous strips 20, 20 of contact metal drawn from a supply roll 21 (Fig. 1). The machine comprises two circular welding electrodes 22, 22 which are mounted for movement toward and away from each other in the manner hereinafter described. The switch spring is placed on a shelf-like supporting bracket 18 which is provided with a plurality of pins or projections 19, 19 for locating and holding the switch spring in an edgewise position, with an end portion thereof disposed between the two welding electrodes, as best shown in Figs. 3, 4 and 5.

Each of the welding electrodes is clamped to a circular head portion 24 of a horizontal electrode supporting bar 25 which is secured to the free upper ends of a series of vertically disposed metal reeds or flat springs 26, 26 (Fig. 4). At their lower ends, these flat springs are anchored to L-shaped metal blocks 27, 27 fixed to a base plate 28. Thus, due to the flexibility of the electrode supporting springs 26, the two welding electrodes are capable of oscillatory movement toward and away from each other. Moreover, since the electrode supporting springs are flexible in one plane only, they permit movement of the welding electrodes in one plane only and, thus, serve to guide the electrodes in their movements toward and away from each other so that the guideways usually provided for this purpose may be eliminated. The electrode supporting springs also serve to conduct the welding current from the fixed blocks 27 to the movable welding electrodes. By means of suitable bus bars 29, portions of which are shown in Figs. 2 and 4, the welding current is conducted to the blocks 27 from a suitable current supply source (not shown).

It will be obvious that the spring mounting blocks 27 may be positioned on the base plate so that the springs will be tensioned so as to urge the two electrodes either toward each other or away from each other. However, in the illustrated embodiment of the invention, separate means are provided for moving the electrodes toward and away from each other. Thus, for moving the electrodes toward each other, there is associated with each of the electrode supporting bars 25 a spring pressed plunger 30 which bears against a depending lug 31 on the tail end of the electrode supporting bar. Each of the plungers is housed in a casing 32 which is adjustably mounted, as shown in Fig. 4, in the upper end of a vertical supporting plate 33 secured to the base plate.

The welding electrodes are moved away from each other and are held in their retracted positions, shown in the drawings, by means of two electrical solenoids 35, 35, one for each electrode. Each of these solenoids is operatively connected to the associated electrode supporting bar through a bell crank 36 rotatably mounted on a vertical supporting post 37 (Figs. 2 and 4). Each of the bell cranks comprises a long horizontal arm 38 and a short vertical arm 39. The horizontal arm is pivotally connected by means of a link 40 to the plunger 41 of the associated solenoid 35, and the vertical arm carries a roller 43 which bears against a depending lug 44 on the forward end of the electrode supporting bar. The vertical arms of the two bell cranks are interconnected by a coil spring 45 which serves to counter-balance the weight of the bell cranks, so that this weight is not required to be overcome by the electrode operating plungers 30. Thus, upon deenergization of the solenoids 35, the welding electrodes are quickly moved toward each other under the forces of the spring pressed plungers 30, which forces may be adjusted by simply adjusting the positions of the plunger casings 32 in the supporting plate 33.

Each of the electrode supporting bars 25 is formed with a longitudinal bore 47 (Fig. 5) for slidably accommodating a knife carrying bar 48, the forward end of which is offset so that a shoulder 49 is provided for engaging the forward end of the electrode supporting bar to limit outward movement of the knife carrying bar. A chisel-like knife 50 is secured to the offset forward end of each knife supporting bar, and it will be noted by referring to Fig. 5 that the knives 50 slidably engage the flat back surfaces of the welding electrodes 22. An adjustable gib 52 is provided in the bore 47 of each of the electrode supporting bars for holding the knife in close sliding engagement with the back surface of the electrode. Each of the knives is held in its retracted position by a coil spring 53 which is compressed between a shoulder 54 on associated knife carrying bar 48 and a shoulder 55 in the bore 47 of associated electrode supporting bar 25.

The outer end of each knife carrying bar 48 extends beyond the outer end of the associated electrode supporting bar 25 and is adapted to be engaged by a roller 57 (Fig. 4) on a vertical rocker arm 58 secured to a horizontal shaft 60 rotatably journaled in supporting plate 33. A stop pin 61 on plate 33 limits clockwise movement of this rocker arm and a spring 63 holds the rocker arm against the stop pin. A horizontal arm 64 is secured at one end to the shaft 60 and is provided at its outer end with an adjustable abutment screw 65 which is adapted to be struck by a plunger 67 of an electrical solenoid 68, whereby the shaft 60 is rocked counter-clockwise thereby causing rocker arm 58 to operate the knife bar 48. An adjustable stop pin 69 on plate 33 is adapted to be engaged by arm 64 to limit the counter-clockwise movement of the rock shaft 60.

The contact strip feeding mechanism comprises a tubular spindle 75 (Figs. 3 and 5), which is endwise slidable in a sleeve or tubular casing 76, the latter being slidable in a guide block 77 secured to a vertical supporting plate 78. At the forward end of the spindle 75 there is attached a chuck 80 comprising a rigid tongue-like center jaw 81 (Fig. 5) and two pivoted jaws 82, 82 on opposite sides of the rigid jaw. The two contact strips 20 pass through the spindle and emerge therefrom on opposite sides of the rigid chuck jaw 81, and each of the pivoted jaws is adapted to cooperate with the rigid jaw to grip one of the contact strips. The pivoted jaws are formed with tapered outer surfaces 83, 83 and the forward end of casing 76 is formed with an internal tapered surface 84 for cooperating with the tapered surfaces 83 of the pivoted jaws to close them when the chuck together with the spindle is shifted toward the right (Fig. 3) relative to the casing.

The spindle and chuck are normally urged toward the right (Fig. 3) by a coil spring 86 which serves to yieldably hold the chuck jaws in their clamping positions. This spring encircles the spindle and is compressed between the chuck and a spacer bushing 87 disposed in the tail end portion of casing 76. Endwise movement of the spindle toward the left against the opposing force of spring 86 is accomplished by an electrical solenoid 90. A plunger 91 of this solenoid is connected by a link 92 to a horizontal arm 93 of a bell crank 94 which is pivoted at 95 on supporting plate 78. A bifurcated vertical arm 96 of this bell crank is adapted to engage a flanged collar 98 on the tail end of the spindle to shift the latter toward the left when the bell crank is rocked counter-clockwise by solenoid 90. An adjustable stop screw 100 limits counter-clockwise movement of the bell crank 94 and clockwise movement thereof is limited by a similar adjustable stop screw 101. A coil spring 103 yieldably holds the bell crank against stop screw 101.

The casing 76 is yieldably urged toward the right (Fig. 3) by an adjustable coil spring 105 and an external shoulder 106 on the casing cooperates with an internal shoulder 107 in guide block 77 to limit the extent of endwise movement of the casing under the force of the spring. An external shoulder 109 on the tail end of the casing is adapted to be engaged by a bifurcated end of a vertical rocker arm 110 which is secured to a horizontal shaft 112 rotatably journaled in supporting plate 78. Also secured to shaft 112 is a horizontal arm 114 which is connected by a link 115 to a plunger 116 of an electrical solenoid 117. Thus, when this solenoid is energized, the shaft together with rocker arm 96 is rotated in a counter-clockwise direction, thereby retracting the casing 76 toward the left (Fig. 3). An adjustable stop screw 119 limits the extent of counter-clockwise movement of the bell crank, whereby the retraction of the casing 76 is also limited.

In the operation of the machine, the solenoids 35 normally hold the two welding electrodes 22 in their retracted positions against the opposing force of the spring pressed plungers 30, and solenoid 117 normally holds the contact strip feeding mechanism in its retracted position against the opposing force of spring 105. The chuck carrying spindle 75 is held in its retracted position by solenoid 90 which is opposed by the spring 86. Upon deenergization of this solenoid, the spindle is moved toward the right (Fig. 3) by spring 86, whereby the chuck jaws are caused to firmly grip the two contact metal strips in the manner described above. Then, solenoid 117 is deenergized, whereupon the spring 105 moves the entire contact strip feeding mechanism toward the right to the position shown in Fig. 3, thus inserting the end portions of the two contact strips 20 between the two electrodes and on opposite sides of a switch spring 15 placed by the operator on the support 18. Solenoids 35 are then deenergized, whereupon the spring pressed plungers 30 move the two welding electrodes toward each other thus clamping the end portions of the two contact metal strips to opposite sides of the switch spring. Next, solenoid 90 is energized and thereby caused to retract the chuck carrying spindle, thus releasing the chuck jaws 82 after which solenoid 117 is energized and thereby caused to retract the entire contact strip feeding mechanism rearwardly along the clamped contact strips.

Immediately following the clamping of the contact strips to opposite sides of the switch spring, solenoids 68 are momentarily energized and thereby caused to operate the knives 50 to sever the clamped end portions from the continuous contact metal strips, after which the knives are retracted by the springs 53 (Fig. 5). The severed end portions of the contact metal strips are then electrically welded to opposite sides of the switch spring, the welding current being conducted to the electrodes by the flexible electrode supporting reeds 26. After the welding operation, solenoids 35 are energized and thereby caused to retract the welding electrodes, thus completing an operating cycle of the machine.

It is to be understood that the invention is not limited to the embodiments thereof herein illustrated and described but is capable of other applications within the scope of the appended claims.

What is claimed is:

1. In an electric welding machine, a movable electrode, and a plurality of resilient electrical conducting elements for movably supporting and guiding said electrode and for conducting a welding current thereto.

2. In an electric welding machine, a movable electrode, and a plurality of resilient electrical conducting elements for movably supporting and guiding said electrode and for conducting a welding current thereto, said electrode supporting elements being flexible in one plane only.

3. In an electric welding machine, a movable electrode, a plurality of resilient electrical conducting elements for movably supporting and guiding said electrode and for conducting a welding current thereto, an electrical solenoid for moving said electrode in one direction, and a spring for urging the electrode in the opposite direction.

4. In an electric welding machine, a movable electrode, and a plurality of resilient elements for supporting and guiding said electrode for oscillatory movement, said electrode supporting elements being flexible in one plane only.

5. In an electric welding machine, a movable electrode, and a plurality of flat springs for supporting said electrode for oscillatory movement and for conducting a welding current thereto.

6. In an electric welding machine, a support, a plurality of resilient electrical conducting elements, each attached at one end to the support, said elements being flexible in one plane only, and a welding electrode secured to the opposite ends of said elements and supported and guided solely by said elements.

7. In an electric welding machine, a support, a plurality of spaced parallel flat springs, each attached at one end to the support, and a movable welding electrode secured to the opposite ends of said springs and supported and guided solely by said springs.

8. In an electric welding machine, a pair of opposed movable electrodes, and a plurality of spaced parallel metal reeds for conducting a welding current to said electrodes and for supporting and guiding said electrodes for movements toward and away from each other in parallel planes only, said reeds constituting the sole supporting and guiding means for said electrodes.

9. In an electric welding machine, a movable welding electrode, and a plurality of spaced parallel metal reeds for movably supporting and guiding said electrode and for conducting a welding current thereto.

FRANK MARTINDELL.